United States Patent [19]
Freedy et al.

[11] Patent Number: 5,785,139
[45] Date of Patent: Jul. 28, 1998

[54] COOLING SYSTEM MOUNTING ARRANGEMENT AND METHOD

[75] Inventors: Allan L. Freedy, Aurora; Glenn W. Shields, Big Rock; Stephen D. Tiernan, Peoria, all of Ill.; Kenneth J. Chlad, Chagrin Falls, Ohio

[73] Assignee: Caterpillar Inc., Peoria, Ill.

[21] Appl. No.: 452,553

[22] Filed: May 25, 1995

[51] Int. Cl.⁶ .................................................. B60K 11/02
[52] U.S. Cl. ........................................ 180/68.1; 180/68.4
[58] Field of Search ................................ 180/68.1, 68.2, 180/68.4, 68.6, 298; 55/290, 385, 400; 123/41.49

[56] References Cited

U.S. PATENT DOCUMENTS

| | | | |
|---|---|---|---|
| 2,912,057 | 11/1959 | Wagner | 180/68.4 |
| 3,334,704 | 8/1967 | Gehrke et al. | 180/68.4 |
| 3,638,749 | 2/1972 | Graham et al. | 180/68.4 |
| 3,837,149 | 9/1974 | West et al. | 180/68.4 |
| 4,825,815 | 5/1989 | Turner | 180/68.4 |

*Primary Examiner*—Richard M. Camby
*Attorney, Agent, or Firm*—Dennis C. Skarvan; D. L. Charlton

[57] ABSTRACT

A cooling system mounting arrangement includes a platform of an article of construction machinery and an engine enclosure and a cab and cab riser mounted to the platform. The engine enclosure includes an engine and associated engine cooling system. The cab is mounted atop the cab riser, and the cab riser is adapted for ducting cooling air to an auxiliary cooling system disposed in the cab riser separate from the engine cooling system. The auxiliary cooling system includes a heat exchanger and a fan assembly for flowing cooling air across the heat exchanger. The fan assembly is movably mounted to the cab riser for movement between a first position adjacent to the heat exchanger for flowing cooling air across the heat exchanger and a second position spaced apart from the heat exchanger to permit access to the downstream side of the heat exchanger for cleaning and maintenance. An inlet screen is mounted to an inlet of the cab riser and is similarly movable between a first position adjacent to the heat exchanger and a second position spaced apart from the heat exchanger to permit access to the upstream side of the heat exchanger for cleaning and maintenance.

20 Claims, 6 Drawing Sheets

Fig-4-

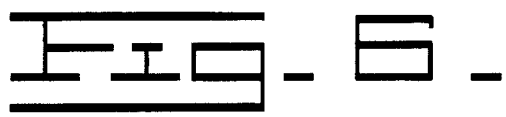
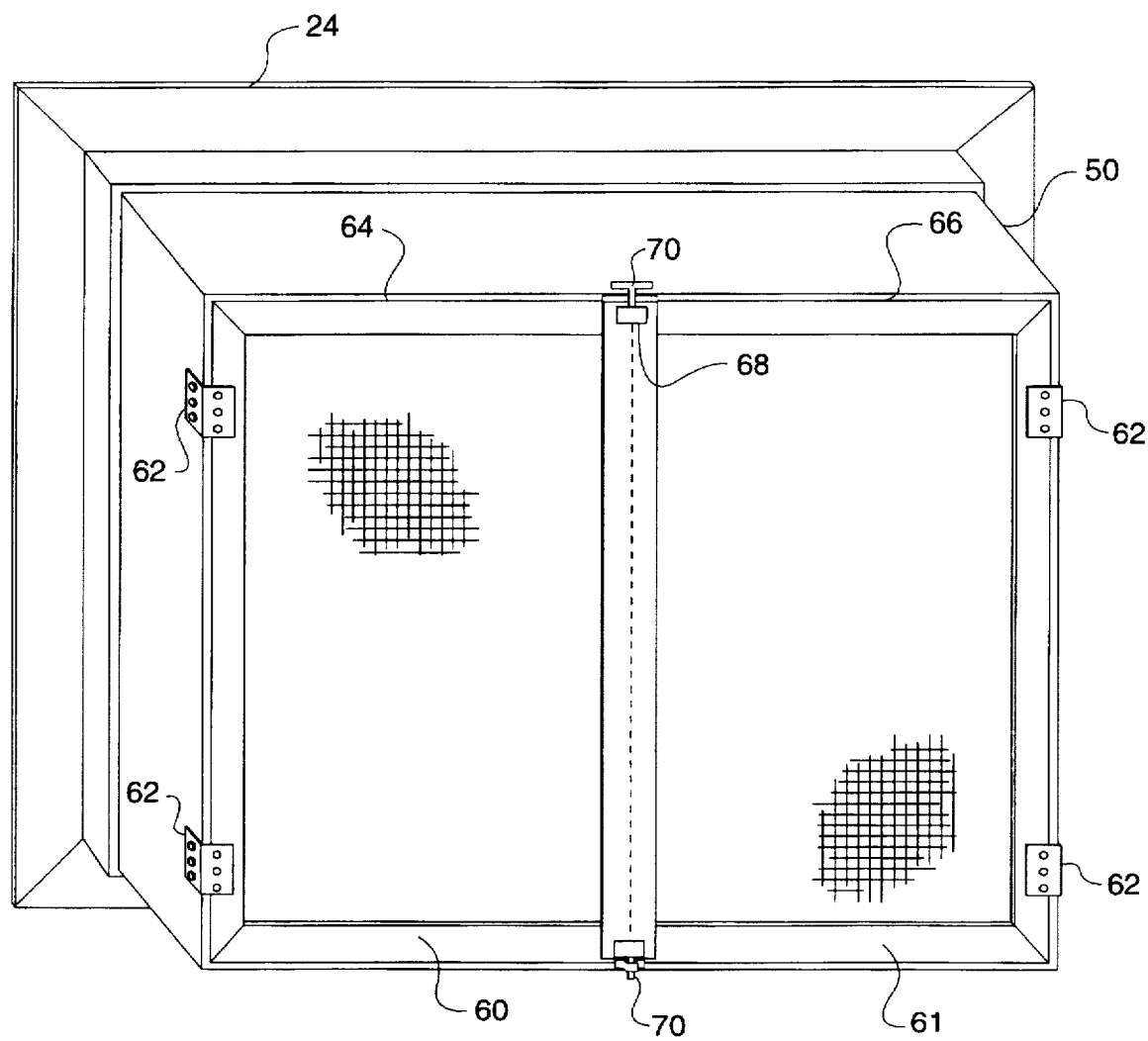

COOLING SYSTEM MOUNTING ARRANGEMENT AND METHOD

TECHNICAL FIELD

The present invention relates generally to a cooling system mounting arrangement for use with construction equipment and, more particularly, to a cooling system mounted in the cab riser of an article of construction machinery and/or a cooling system configured to permit easy access to a heat exchanger for maintenance thereof.

BACKGROUND ART

Prior auxiliary cooling system mounting arrangements have typically located the auxiliary cooling system adjacent to the engine of an article of construction machinery to take advantage of the existing engine cooling system fan and ducting. For example, the heat exchanger core of an oil cooling system is typically mounted adjacent to the heat exchanger core and fan of the engine radiator package. In most cases, the various heat exchanger cores and fan are fixedly mounted and, therefore, require disassembly for maintenance. Alternately, the radiator and oil cooler may be pivotally mounted adjacent to the engine to facilitate access to the radiators. See, for example, U.S. Pat. No. 4,696,361 issued to Clark et al. on Sep. 29, 1987.

Still, there is always a need for an improved cooling system mounting arrangement. For example, it is desirable for the cooling system to be mounted remote from the engine and its associated heat load to reduce cooling fan speeds and resulting noise levels. It is also desirable for the cooling system to have a fixedly mounted heat exchanger core.

DISCLOSURE OF THE INVENTION

According to one embodiment of the present invention, a cooling system mounting arrangement for use with construction equipment is disclosed, comprising a platform of an article of construction machinery, an engine enclosure mounted to the platform, the engine enclosure including an engine cooling system, a cab riser mounted to the platform adjacent to the engine enclosure, the cab riser being adapted for ducting cooling air to an auxiliary cooling system, a cab mounted to the cab riser, and an auxiliary cooling system disposed in the cab riser separate from the engine cooling system, the auxiliary cooling system including a heat exchanger and a fan assembly for flowing cooling air across the heat exchanger.

According to another embodiment of the present invention, a cooling system mounting arrangement for use with construction equipment is disclosed, comprising a heat exchanger and a fan assembly mounted adjacent to the heat exchanger, the fan assembly being movable between a first position in which the fan assembly is adjacent to the heat exchanger for flowing cooling air across the heat exchanger and a second position in which the fan assembly is spaced apart from the heat exchanger to permit access to the heat exchanger for cleaning and maintenance thereof.

According to another embodiment of the present invention, a method for maintaining the cooling system of an article of construction machinery is disclosed, the cooling system including a heat exchanger and a fan assembly mounted adjacent to the heat exchanger, the method comprising the steps of (a) mounting the fan assembly adjacent to the heat exchanger, the fan assembly being movable between closed and open positions; (b) moving the fan assembly to its closed position in which the fan assembly is adjacent to the heat exchanger for flowing cooling air across the heat exchanger; and (c) moving the fan assembly to its open position in which the fan assembly is spaced apart from the heat exchanger to permit access to the heat exchanger for cleaning and maintenance thereof.

According to another embodiment of the present invention, a method of mounting an auxiliary cooling system of an article of construction machinery is disclosed, the article including a platform and an engine enclosure and a cab riser mounted atop the platform, the engine enclosure housing an engine and engine cooling system, the method comprising the steps of (a) mounting the auxiliary cooling system in the cab riser separate from the engine cooling system, the auxiliary cooling system including a heat exchanger and a fan assembly for flowing cooling air across the heat exchanger; and (b) mounting the fan assembly adjacent to the heat exchanger, the fan assembly being movable between a first position in which the fan assembly is adjacent to the heat exchanger for flowing cooling air across the heat exchanger and a second position in which the fan assembly is spaced apart from the heat exchanger to permit access to the heat exchanger for cleaning and maintenance thereof.

BRIEF DESCRIPTION OF THE DRAWINGS

FIG. 6 is a perspective view of a second inlet structure of the cab riser of FIG. 1.

BEST MODE FOR CARRYING OUT THE INVENTION

Figure 1:
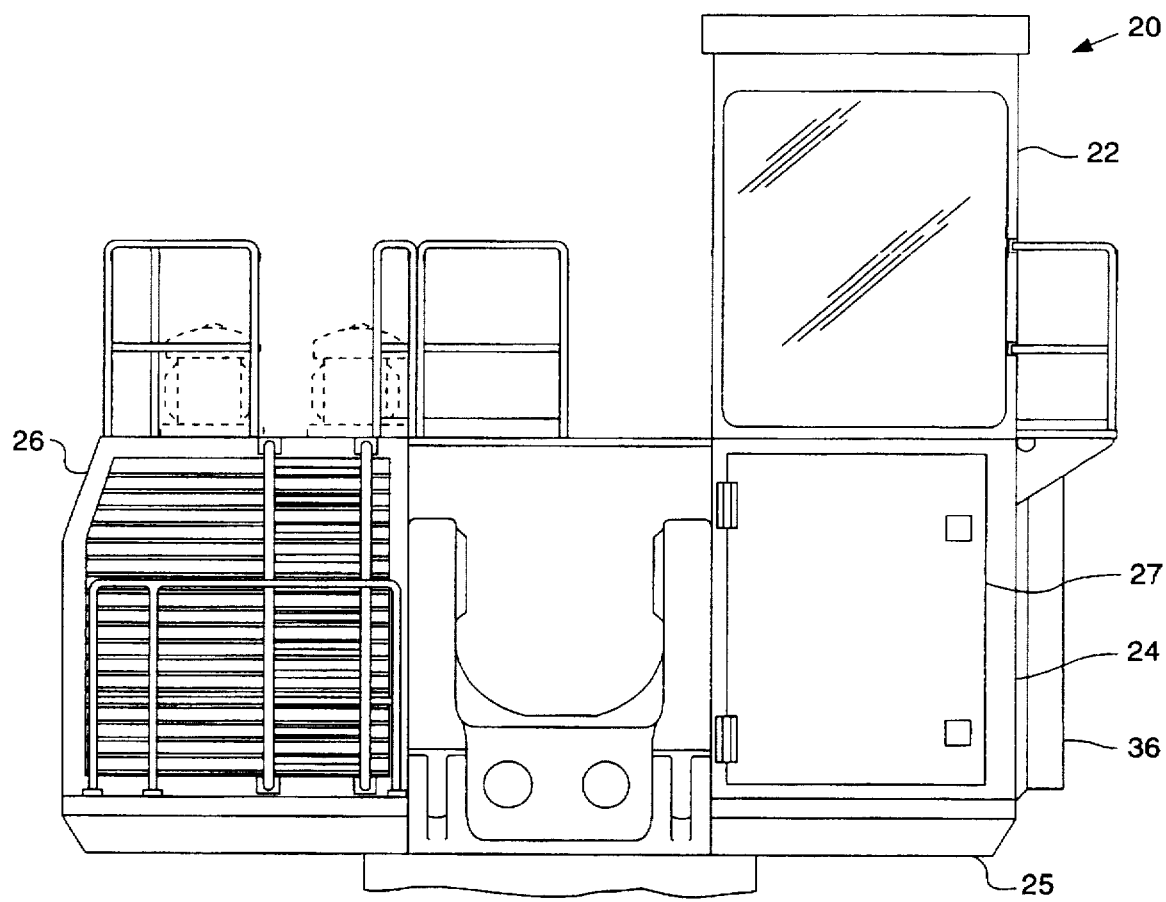
FIG. 1 is a front elevational view of an engine enclosure, cab and cab riser mounted to a platform of an excavator according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
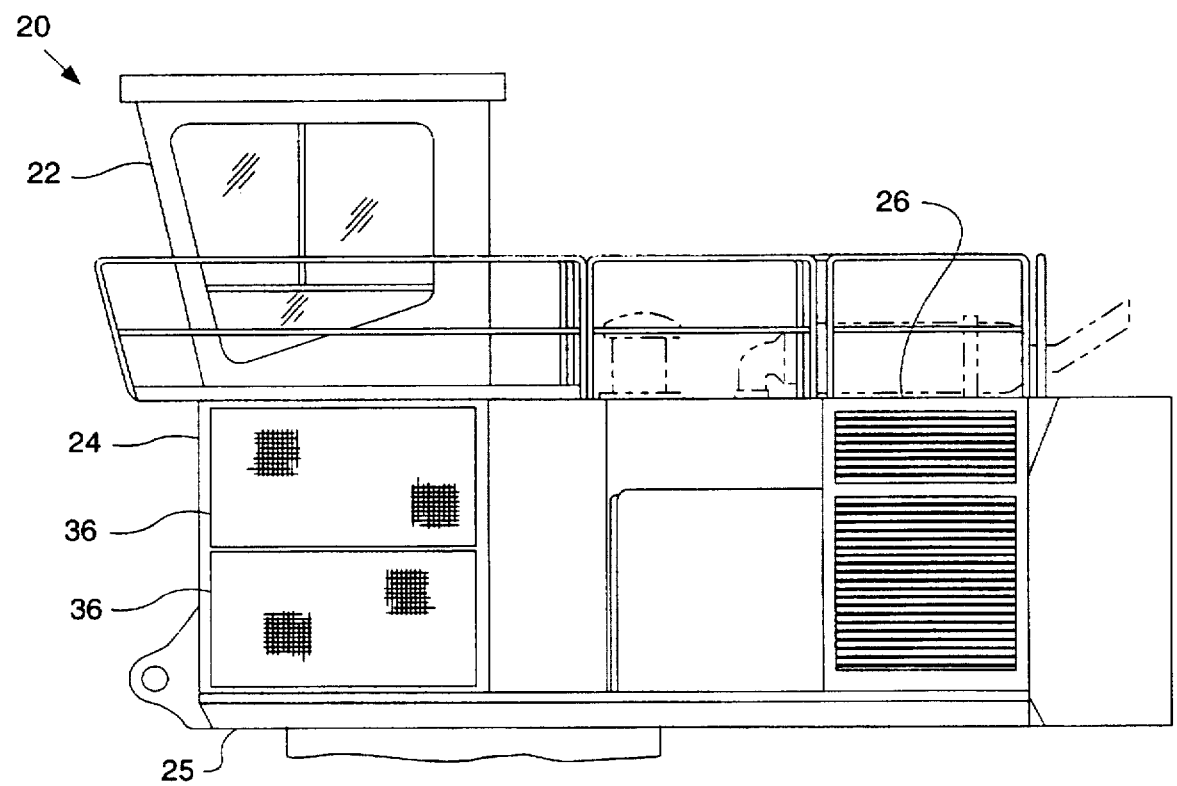
FIG. 2 is a front elevational view of the excavator of FIG. 1.

Referring now to FIGS. 1 and 2, partial elevational views of the upper structure of an excavator 20 are shown. Excavator 20 is typical of other large articles of construction machinery in that it includes a cab 22 mounted atop a cab riser 24 and platform 25. Platform 25 mounts atop an undercarriage (not shown) which drives the excavator as is known in the art. Various power modules for driving the undercarriage and the machine hydraulic systems are disposed adjacent to the cab riser 24 and include, by way of example, a diesel engine and various hydraulic pumps and motors, all of which are mounted in an engine enclosure indicated generally at 26.

Prior art excavators have typically mounted any auxiliary heat exchangers adjacent to the engine within the engine enclosure 26 to take advantage of the existing fan and ducting of the engine cooling system. However, because of the heat load within the engine enclosure, the engine fan must run at high speeds to circulate sufficient cooling air across the various heat exchanger cores. Further, the various heat exchanger cores are difficult to access for maintenance, for example cleaning, thus tending to increase the engine fan flow requirement.

The present invention disposes auxiliary cooling system (s) of the excavator remote from the engine enclosure to increase the effectiveness of the auxiliary heat exchanger and improves the maintainability of the auxiliary cooling system by allowing easy access to the heat exchanger core for routine cleaning. In particular, the oil cooling system of excavator 20 is disposed within the cab riser 24 separate from the engine cooling system. An access panel or door 27 is mounted to the cab riser 24 for accessing the auxiliary cooling system.

Figure 3:
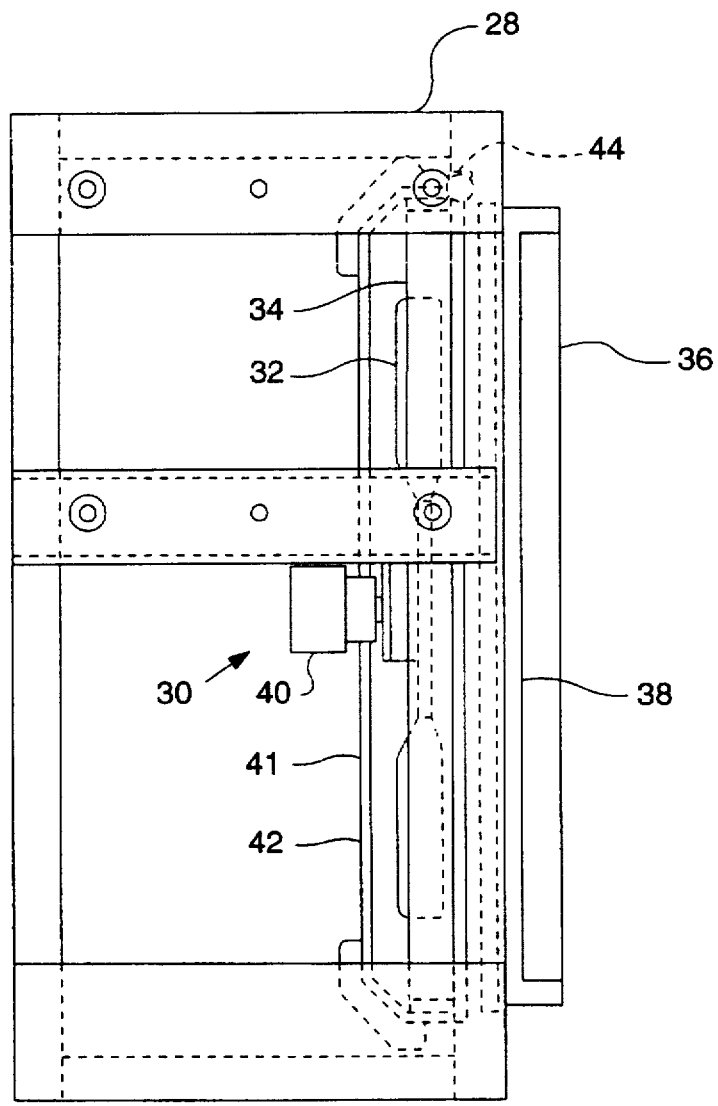
FIG. 3 is a top cross-sectional view of an auxiliary cooling system disposed within the cab riser of FIG. 1.

Referring now to FIG. 3, a top cross-sectional view of the cab riser 24 shows the auxiliary cooling system in greater detail. Cab riser 24 defines a generally box-shaped compartment 28 which houses the various components of the auxiliary cooling system. In the specific preferred embodiment, the auxiliary cooling system is an oil cooling system 30 for cooling the hydraulic fluid used in the various hydraulic pumps and motors of the excavator. Oil cooling system 30 is typical of conventional oil cooling systems in that it includes a fan assembly 32 which induces the flow of ambient cooling air through one or more inlet screens 36 and across a heat exchanger core 38.

Fan assembly 32 includes a conventional bladed fan rotatably disposed within a protective cage (not shown). The fan assembly 32 is mounted within a pivotable rectangular frame 34 which pivots between an operating position and a maintenance position as discussed hereinafter in greater detail. Hydraulic fluid from the excavator hydraulic system is circulated through heat exchanger core 38 by a separate pump and is cooled by the fan supplied cooling air. The ambient cooling air is exhausted through an outlet of compartment 28 opposite inlets 36. In the specific preferred embodiment, fan assembly 32 includes a constant speed fan driven by a hydraulic motor 40. The fan assembly 32 and hydraulic motor 40 are mounted to a cross member 41 of frame 34. Cross member 41 extends across the sides of frame 34 to support the fan assembly and motor at the discharge or aft side of the fan frame.

Figure 4:
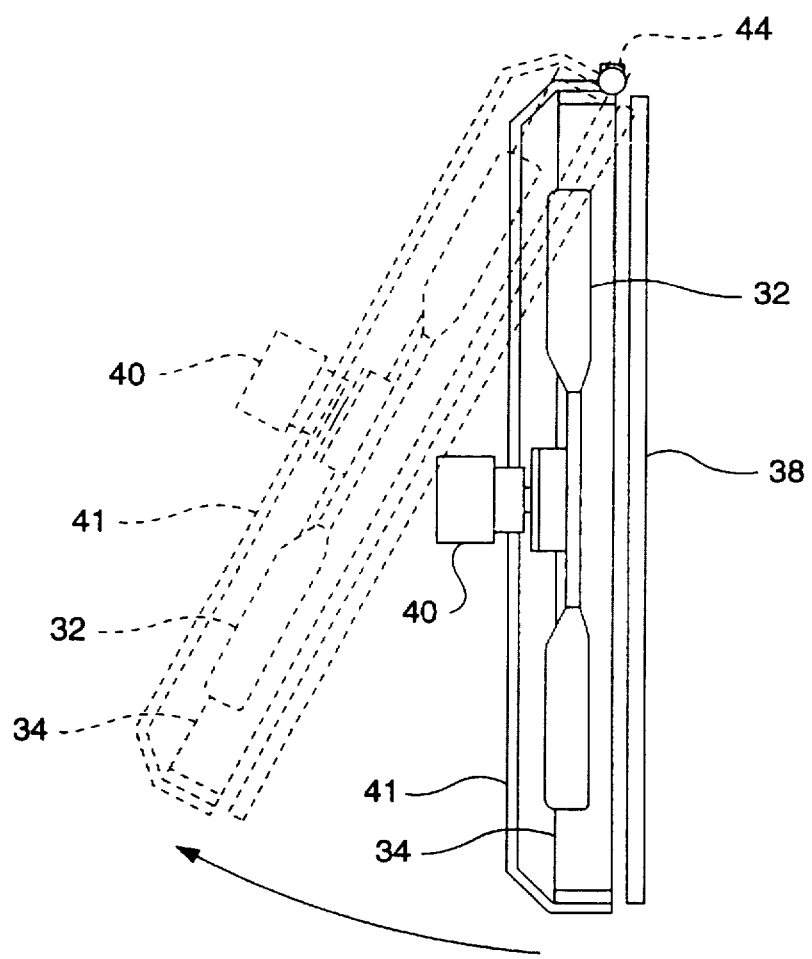
FIG. 4 is a top cross-sectional view of a fan assembly of the auxiliary cooling system of FIG. 3 depicting its movement between open and closed positions.

Referring now to FIG. 4, the fan assembly, motor and frame form a unitary structure which operates as a door or access panel permitting easy access to the downstream side of heat exchanger core 38. Frame 34 is pivotally mounted to compartment 28 at hinge 44. In the specific preferred embodiment shown, hinge 44 is a conventional piano-type hinge which supports the fan assembly, motor and frame along the entire length of a side of the frame. In its operating position, frame 34 is locked to compartment 28 by a pinned latching mechanism. When unlocked, frame 34 is free to pivot about hinge 44 in a clock-wise direction towards the back wall of compartment 28 to expose the aft or discharge side of core 38 for cleaning and maintenance thereof.

Figure 5:
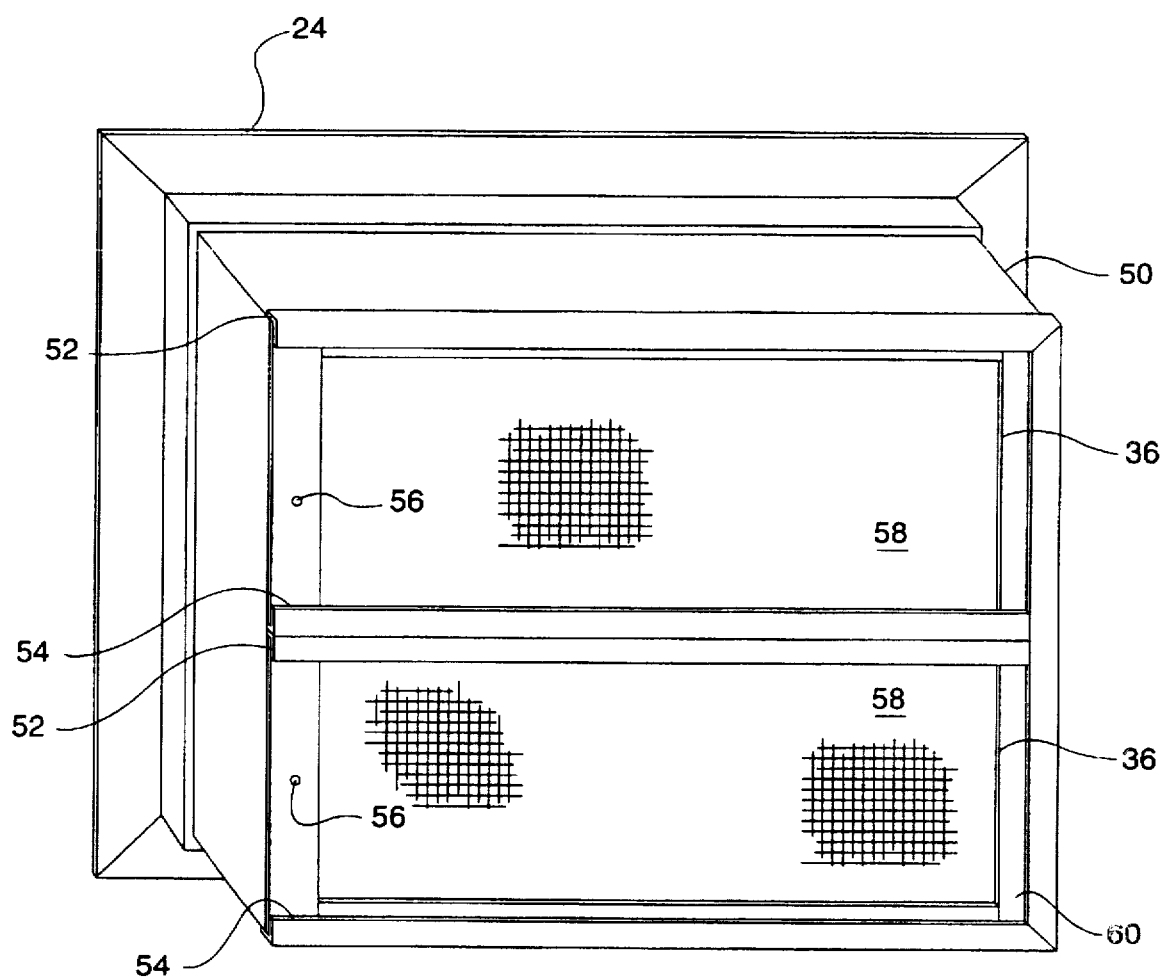
FIG. 5 is a perspective view of a first inlet structure of the cab riser of FIG. 1.

To provide additional access to the heat exchanger core, inlet screens 36 are removable to expose the front or inlet side of core 38. Referring now to FIGS. 5 and 6, the mounting of inlet screens 36 is shown in greater detail. In the embodiment shown in FIG. 5, screens 36 are slidably disposed in a box-like duct 50. Duct 50 mounts across an opening in the side of cab riser 24 to define the inlet of the auxiliary cooling system. Tracks 52 and 54 are laterally disposed across duct 50. Inlet screens 36 slide between respective tracks 52 and 54 and are locked in place by conventional pins 56. In a specific embodiment, screens 36 are constructed of a wire mesh 58 attached within a rectangular frame 60.

Referring now to FIG. 6, a preferred embodiment for the mounting of the inlet screens is shown. A similar box-like duct 50 mounts across an opening in the side of cab riser 24 to define the inlet to the auxiliary cooling system, and the screens are similarly constructed of a wire mesh attached within a rectangular frame. However, rather than having removable inlet screens as shown in FIG. 5, inlet screens 60 and 61 of FIG. 6 are mounted to duct 50. In particular, inlet screens 60 and 61 are hinged at opposite sides of duct 50 by hinges 62. As such, the inlet screens rotate outwardly to expose the front or inlet side of core 38. The frames 64 and 66 of screens 60 and 61, respectively, are configured to overlap one another such that screen 61 maintains screen 60 in its closed position when screen 61 is latched. In the specific preferred embodiment, clasps 68 are mounted to screen 61 and engage with latching pins 70 mounted to duct 50.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For example, other embodiments than the specific preferred embodiment shown herein might come within the spirit of the invention if they separate the auxiliary cooling system from the engine cooling system as shown and described herein. Still other embodiments might come within the spirit of the invention if they provide a fan assembly movable between a closed position and a maintenance position in which a side of the heat exchanger core is easily accessed for cleaning as shown and described herein. Still other embodiments might come within the spirit of the invention if they provide inlet screens movable between a closed position and a maintenance position in which the other side of the heat exchanger core is easily accessed for cleaning as shown and described herein.

What is claimed is:

1. A cooling system mounting arrangement for use with construction equipment, comprising:

a platform of an article of construction machinery;

an engine enclosure mounted to said platform, said engine enclosure including an engine cooling system;

a cab riser mounted to said platform adjacent to said engine enclosure, said cab riser being adapted for ducting cooling air to an auxiliary cooling system;

a cab mounted to said cab riser; and an auxiliary cooling system disposed in said cab riser separate from said engine cooling system, said auxiliary cooling system including a heat exchanger and a fan assembly for flowing cooling air across said heat exchanger.

2. The cooling system mounting arrangement of claim 1, wherein said fan assembly is movably mounted to said cab riser for movement between a first position in which said fan assembly is adjacent to said heat exchanger for flowing cooling air across said heat exchanger and a second position in which said fan assembly is spaced apart from said heat exchanger to permit access to said heat exchanger for cleaning and maintenance thereof.

3. The cooling system mounting arrangement of claim 2, wherein said fan assembly is hinged to said cab riser for pivoted movement between said first position and said second position.

4. The cooling system mounting arrangement of claim 3, wherein said fan assembly includes a fan drive and fan adapted for inducing the flow of cooling air across said heat exchanger.

5. The cooling system mounting arrangement of claim 4, wherein said fan and said fan drive are mounted in a frame, said frame being hinged to said cab riser.

6. The cooling system mounting arrangement of claim 5, wherein said frame includes a latch for locking said fan assembly in said first position.

7. The cooling system mounting arrangement of claim 2, and further comprising an inlet screen movably mounted to an inlet of said cab riser for movement between a first position in which said inlet screen is adjacent to said heat exchanger and a second position in which said inlet screen is spaced apart from said heat exchanger to permit access to said heat exchanger for cleaning and maintenance thereof.

8. The cooling system mounting arrangement of claim 7, wherein said inlet screen includes a wire mesh attached within a frame, said frame being slidably received in corresponding tracks of said inlet.

9. The cooling system mounting arrangement of claim 7, wherein said inlet screen includes a wire mesh attached within a frame, said frame being hinged to said inlet.

10. A cooling system mounting arrangement for use with construction equipment, comprising:

a heat exchanger; and a fan assembly mounted adjacent to said heat exchanger, said fan assembly being adapted for hingedly mounting to a structure of said construction equiment for pivoted movement between a first position in which said fan assembly is adjacent to said heat exchanger for flowing cooling air across said heat exchanger and a second position in which said fan assembly is spaced apart from said heat exchanger to permit access to said heat exchanger for cleaning and maintenance thereof.

11. The cooling system mounting arrangement of claim 10, wherein said fan assembly includes a fan drive and fan adapted for inducing the flow of cooling air across said heat exchanger.

12. The cooling system mounting arrangement of claim 11, wherein said fan and said fan drive are mounted in a frame, said frame being adapted for hingedly mounting to said structure.

13. The cooling system mounting arrangement of claim 12, wherein said frame includes a latch for locking said fan assembly in said first position.

14. The cooling system mounting arrangement of claim 10, and further comprising an inlet screen adapted for mounting to an inlet structure of said construction equipment, wherein said inlet screen is movable between a first position in which said inlet screen is adjacent to said heat exchanger and a second position in which said inlet screen is spaced apart from said heat exchanger to permit access to said heat exchanger for cleaning and maintenance thereof.

15. The cooling system mounting arrangement of claim 14, wherein said inlet screen includes a wire mesh attached within a frame, said frame being adapted for slidable receipt in corresponding tracks of said inlet structure.

16. The cooling system mounting arrangement of claim 14, wherein said inlet screen includes a wire mesh attached within a frame, said frame being adapted for hingedly mounting to said inlet structure.

17. A method for maintaining the cooling system of an article of construction machinery, the cooling system including a heat exchanger and a fan assembly, the method comprising the steps of:

hingedly mounting the fan assembly adjacent to the heat exchanger for pivoted movement between closed and open positions;

moving the fan assembly to its closed position in which the fan assembly is adjacent to the heat exchanger for flowing cooling air across the heat exchanger; and moving the fan assembly to its open position in which the fan assembly is spaced apart from the heat exchanger to permit access to the heat exchanger for cleaning and maintenance thereof.

18. The method of claim 17, and further comprising the steps of:

mounting an inlet screen adjacent to the heat exchanger, the inlet screen being movable between closed and open positions;

moving the inlet screen to its closed position in which the inlet screen is adjacent to the heat exchanger; and moving the inlet screen to its open position in which the inlet screen is spaced apart from the heat exchanger to permit access to the heat exchanger for cleaning and maintenance thereof.

19. A method of mounting an auxiliary cooling system of an article of construction machinery, the article including a platform and an engine enclosure and a cab riser mounted atop the platform, the engine enclosure housing an engine and engine cooling system, the method comprising the steps of:

mounting the auxiliary cooling system in the cab riser separate from the engine cooling system, the auxiliary cooling system including a heat exchanger and a fan assembly for flowing cooling air across the heat exchanger; and mounting the fan assembly adjacent to the heat exchanger, the fan assembly being movable between a first position in which the fan assembly is adjacent to the heat exchanger for flowing cooling air across the heat exchanger and a second position in which the fan assembly is spaced apart from the heat exchanger to permit access to the heat exchanger for cleaning and maintenance thereof.

20. The method of claim 19, and further comprising the step of mounting an inlet screen adjacent to the heat exchanger, the inlet screen being movable between a first position in which the inlet screen is adjacent to the heat exchanger and a second position in which the fan assembly is spaced apart from the heat exchanger to permit access to the heat exchanger for cleaning and maintenance thereof.

* * * * *